United States Patent [19]
Rtischev et al.

[11] Patent Number: 5,634,086
[45] Date of Patent: May 27, 1997

[54] METHOD AND APPARATUS FOR VOICE-INTERACTIVE LANGUAGE INSTRUCTION

[75] Inventors: Dimitry Rtischev, Menlo Park; Jared C. Bernstein, Palo Alto; George T. Chen, Menlo Park; John W. Butzberger, Foster City, all of Calif.

[73] Assignee: SRI International, Menlo Park, Calif.

[21] Appl. No.: 529,376

[22] Filed: Sep. 18, 1995

Related U.S. Application Data

[63] Continuation of Ser. No. 32,850, Mar. 12, 1993, abandoned.
[51] Int. Cl.$^6$ .................... G10L 3/00; G10L 5/06; G10L 9/00
[52] U.S. Cl. .................. 395/2.79; 395/2.65; 395/2.64; 395/2.66
[58] Field of Search ............... 364/419; 381/41–43, 381/47; 395/2, 2.1, 2.4, 2.44, 2.42, 2.43, 2.41, 2.6, 2.64, 2.65, 2.75, 2.76, 2.55, 2.59, 22, 2.66

[56] References Cited

U.S. PATENT DOCUMENTS

| | | |
|---|---|---|
| 4,276,445 | 6/1981 | Harbeson . |
| 4,380,438 | 4/1983 | Okamoto . |
| 4,641,343 | 2/1987 | Holland . |
| 4,783,803 | 11/1988 | Baker . |
| 4,852,180 | 7/1989 | Levinson ........................ 395/2.65 |

(List continued on next page.)

OTHER PUBLICATIONS

Lines, "A model for assing the ability of an office local area network, employing the technical office protocol (TOP) to carry interactive speech while heavily loaded with data traffic"; International conference on private switching systems and networks, pp. 190–194, 21–23 Jun. 1988.

Kim et al, "A study on the recognition of the Korean monothongs using artificial neural net models"; Proceedings of the 5th Jerusalem Conference on Information Technology, pp. 364–371, 22–25 Oct. 1990.

Wilcox et al, "Training and search algorithms for an interactive wordspotting system"; ICASSP–92, pp. 97–100 vol. 2, 23–26 Mar. 1992.

(List continued on next page.)

*Primary Examiner*—Tariq R. Hafiz
*Attorney, Agent, or Firm*—Philip H. Albert; Townsend and Townsend and Crew LLP

[57] ABSTRACT

Spoken-language instruction method and apparatus employ context-based speech recognition for instruction and evaluation, particularly language instruction and language fluency evaluation. A system can administer a lesson, and particularly a language lesson, and evaluate performance in a natural interactive manner while tolerating strong foreign accents, and produce as an output a reading quality score. A finite state grammar set corresponding to the range of word sequence patterns in the lesson is employed as a constraint on a hidden Markov model (HMM) search apparatus in an HMM speech recognizer which includes a set of hidden Markov models of target-language narrations produced by native speakers of the target language. The invention is preferably based on use of a linguistic context-sensitive speech recognizer. The invention includes a system with an interactive decision mechanism which employs at least three levels of error tolerance to simulate a natural level of patience in human-based interactive instruction. A system for a reading phase is implemented through a finite state machine having at least four states which recognizes reading error at any position in a script and which employs a first set of actions. A related system for an interactive question phase is implemented through a finite state machine, but which recognizes reading errors as well as incorrect answers while invoking a second set of actions. A linguistically-sensitive utterance endpoint detector is provided for judging termination of a spoken utterance to simulate human turn-taking in conversational speech.

20 Claims, 9 Drawing Sheets

U.S. PATENT DOCUMENTS

| | | | |
|---|---|---|---|
| 4,860,360 | 8/1989 | Boggs . | |
| 4,862,408 | 8/1989 | Zamora | 395/600 |
| 4,887,212 | 12/1989 | Zamora et al. | 364/419 |
| 4,969,194 | 11/1990 | Ezawa . | |
| 5,027,406 | 6/1991 | Roberts et al. | 395/2 |
| 5,075,896 | 12/1991 | Wilcox et al. | 381/41 |
| 5,148,489 | 9/1992 | Erell et al. | 381/47 |
| 5,199,077 | 3/1993 | Wilcox et al. | 381/43 |
| 5,268,990 | 12/1993 | Cohen et al. | 395/2 |
| 5,307,444 | 4/1994 | Tsuboka | 395/22 |
| 5,329,608 | 7/1994 | Boccieri et al. | 395/2.52 |
| 5,329,609 | 7/1994 | Sanada et al. | 395/2.6 |
| 5,333,275 | 7/1994 | Wheatley et al. | 395/2.52 |

OTHER PUBLICATIONS

Rabiner et al. "An Introduction to Hidden Markov Models," *IEEE ASSP Magazine,* Jan. 1986, pp. 4–16.

Rose et al. "A Hidden Markov Model Based Keyword Recognition System," *Proceedings of IEEE ICASSP,* 1990.

Bernstein et al. "Automatic Evaluation and Training in English Pronunciation," *Proc. ICSLP* 90, Nov. 1990, Kobe, Japan.

Rtischev et al. "Toward Commercial Application of Speaker–Independent Continuous Speech Recognition," *Proceedings of Speech Tech* 91, (Apr. 23, 1991) New York, New York.

Bernstein et al. "A Voice Interactive Language Instruction System," *Proceedings of Eurospeech* 91, Genoa, Italy. Sep. 25, '91.

METHOD AND APPARATUS FOR VOICE-INTERACTIVE LANGUAGE INSTRUCTION

This is a Continuation of application Ser. No. 08/032,850, filed Mar. 12, 1993, now abandoned.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

MICROFICHE APPENDIX

This application has been filed with a microfiche appendix of 47 frames in length containing source code listings of elements of one embodiment of the present invention.

BACKGROUND OF THE INVENTION

This invention relates to speech recognition and more particularly to the types of such systems based on a hidden Markov models (HMM) for use in language or speech instruction.

By way of background, an instructive tutorial on hidden Markov modeling processes is found in a 1986 paper by Rabiner et al., "An Introduction to Hidden Markov Models," *IEEE ASSP Magazine,* Jan. 1986, pp. 4–16.

Various hidden-Markov-model-based speech recognition systems are known and need not be detailed herein. Such systems typically use realizations of phonemes which are statistical models of phonetic segments (including allophones or, more generically, phones) having parameters that are estimated from a set of training examples.

Models of words are made by making a network from appropriate phone models, a phone being an acoustic realization of a phoneme, a phoneme being the minimum unit of speech capable of use in distinguishing words. Recognition consists of finding the most-likely path through the set of word models for the input speech signal.

Known hidden Markov model speech recognition systems are based on a model of speech production known as a Markov source. The speech units being modeled are represented by finite state machines. Probability distributions are associated with the transitions leaving each node (state), specifying the probability of taking each transition when visiting the node. A probability distribution over output symbols is associated with each node. The transition probability distributions implicitly model duration. The output symbol distributions are typically used to model speech signal characteristics such as spectra.

The probability distributions for transitions and output symbols are estimated using labeled examples of speech. Recognition consists of determining the path through the Markov network that has the highest probability of generating the observed sequence. For continuous speech, this path will correspond to a sequence of word models.

Models are known for accounting for out-of-vocabulary speech, herein called reject phone models but sometimes called "filler" models. Such models are described in Rose et al., "A Hidden Markov Model Based Keyword Recognition System," *Proceedings of IEEE ICASSP,* 1990.

The specific hidden Markov model recognition system employed in conjunction with the present invention is the Decipher speech recognizer, which is available from SRI International of Menlo Park, Calif. The Decipher system incorporates probabilistic phonological information, a trainer capable of training phonetic models with different levels of context dependence, multiple pronunciations for words, and a recognizer. The co-inventors have published with others papers and reports on instructional development peripherally related to this invention. Each mentions early versions of question and answer techniques. See, for example, "Automatic Evaluation and Training in English Pronunciation," *Proc. ICSLP* 90, Nov. 1990, Kobe, Japan. "Toward Commercial Applications of Speaker-Independent Continuous Speech Recognition," *Proceedings of Speech Tech* 91, (Apr. 23, 1991) New York, N.Y. "A Voice Interactive Language Instruction System," *Proceedings of Eurospeech* 91, Genoa, Italy Sep. 25, 1991. These papers described only what an observer of a demonstration might experience.

Other language training technologies are known. For example, U.S. Pat. No. 4,969,194 to Ezawa et al. discloses a system for simple drilling of a user in pronunciation in a language. The system has no speech recognition capabilities, but it appears to have a signal-based feedback mechanism using a comparator which compares a few acoustic characteristics of speech and the fundamental frequency of the speech with a reference set.

U.S. Pat. No. 4,380,438 to Okamoto discloses a digital controller of an analog tape recorder used for recording and playing back a user's own speech. There are no recognition capabilities.

U.S. Pat. No. 4,860,360 to Boggs is a system for evaluating speech in which distortion in a communication channel is analyzed. There is no alignment or recognition of the speech signal against any known vocabulary, as the disclosure relates only to signal analysis and distortion measure computation.

U.S. Pat. No. 4,276,445 to Harbeson describes a speech analysis system which produces little more than an analog pitch display. It is not believed to be relevant to the subject invention.

U.S. Pat. No. 4,641,343 to Holland et al. describes an analog system which extracts formant frequencies which are fed to a microprocessor for ultimate display to a user. The only feedback is a graphic presentation of a signature which is directly computable from the input signal. There is no element of speech recognition or of any other high-level processing.

U.S. Pat. No. 4,783,803 to Baker et al. discloses a speech recognition apparatus and technique which includes means for determining where among frames to look for the start of speech. The disclosure contains a description of a low-level acoustically-based endpoint detector which processes only acoustic parameters, but it does not include higher level, context-sensitive end-point detection capability.

What is needed is a recognition and feedback system which can interact with a user in a linguistic context-sensitive manner to provide tracking of user-reading of a script in a quasi-conversational manner for instructing a user in properly-rendered, native-sounding speech.

SUMMARY OF THE INVENTION

According to the invention, an instruction system is provided which employs linguistic context-sensitive speech recognition for instruction and evaluation, particularly language instruction and language fluency evaluation. The system can administer a lesson, and particularly a language lesson, and evaluate performance in a natural voice-interactive manner while tolerating strong foreign accents from a non-native user. The lesson material and instructions may be presented to the learner in a variety of ways, including, but not limited to, video, audio or printed visual text. As an example, in one language-instruction-specific application, an entire conversation and interaction may be carried out in a target language, i.e., the language of instruction, while certain instructions may be in a language familiar to the user.

In connection with preselected visual information, the system may present aural information to a trainee. The system prompts the trainee-user to read text aloud during a reading phase while monitoring selected parameters of speech based on comparison with a script stored in the system. The system then asks the user certain questions, presenting a list of possible responses. The user is then expected to respond by reciting the appropriate response in the target language. The system is able to recognize and respond accurately and in a natural manner to scripted speech, despite poor user pronunciation, pauses and other disfluencies.

In a specific embodiment, a finite state grammar set corresponding to the range of word sequence patterns in the lesson is employed as a constraint on a hidden Markov model (HMM) search apparatus in an HMM speech recognizer which includes a set of hidden Markov models of target-language narrations (scripts) produced by native speakers of the target language.

The invention is preferably based on use of a linguistic context-sensitive speech recognizer, such as the Decipher speech recognizer available from SRI International of Menlo Park, California, although other linguistic context-sensitive speech recognizers may be used as the underlying speech recognition engine.

The invention includes a mechanism for pacing a user through an exercise, such as a reading exercise, and a battery of multiple-choice questions using an interactive decision mechanism. The decision mechanism employs at least three levels of error tolerance, thereby simulating a natural level of patience in human-based interactive instruction.

A mechanism for a reading phase is implemented through a finite state machine or equivalent having at least four states which recognizes reading errors at any position in a script and which employs a first set of actions. A related mechanism for an interactive question phase also is implemented through another finite state machine having at least four states, but which recognizes reading errors as well as incorrect answers while invoking a second set of actions.

As part of the linguistically context-sensitive speech recognizer, the probabilistic model of speech is simplified by use of a script for narration, while explicitly modeling disfluencies comprising at least pauses and out-of-script utterances.

In conjunction with the interactive reading and question/answer phases, linguistically-sensitive utterance endpoint detection is provided for judging termination of a spoken utterance to simulate human turn-taking in conversational speech.

A scoring system is provided which is capable of analyzing speech and reading proficiency, i.e., speed and error rate, by weighting the proportion of time during correct reading, the ratio of subject reading speed to nominal native reading speed, and the proportion of "alt" units in a recognized word stream.

In connection with a DSP device or an equally-powerful processor, the invention allows for real-time conversation between the system and the user on the subject of a specific lesson. The invention may be used conveniently at a location remote from the system through a telephone network wherein the user accesses the system by selecting a telephone number and references from visual or memorized materials for interaction with the system.

The invention will be better understood by reference to the following detailed description in connection with the accompanying drawings.

BRIEF DESCRIPTION OF THE DRAWINGS

FIG. 4A1 is a first portion of a flowchart of a process of pacing a user through a lesson embedded in an apparatus implemented in accordance with the invention.

FIG. 4A2 is a second portion of a flowchart of a process of pacing a user through a lesson embedded in an apparatus implemented in accordance with the invention.

DESCRIPTION OF SPECIFIC EMBODIMENTS

Figure 1:
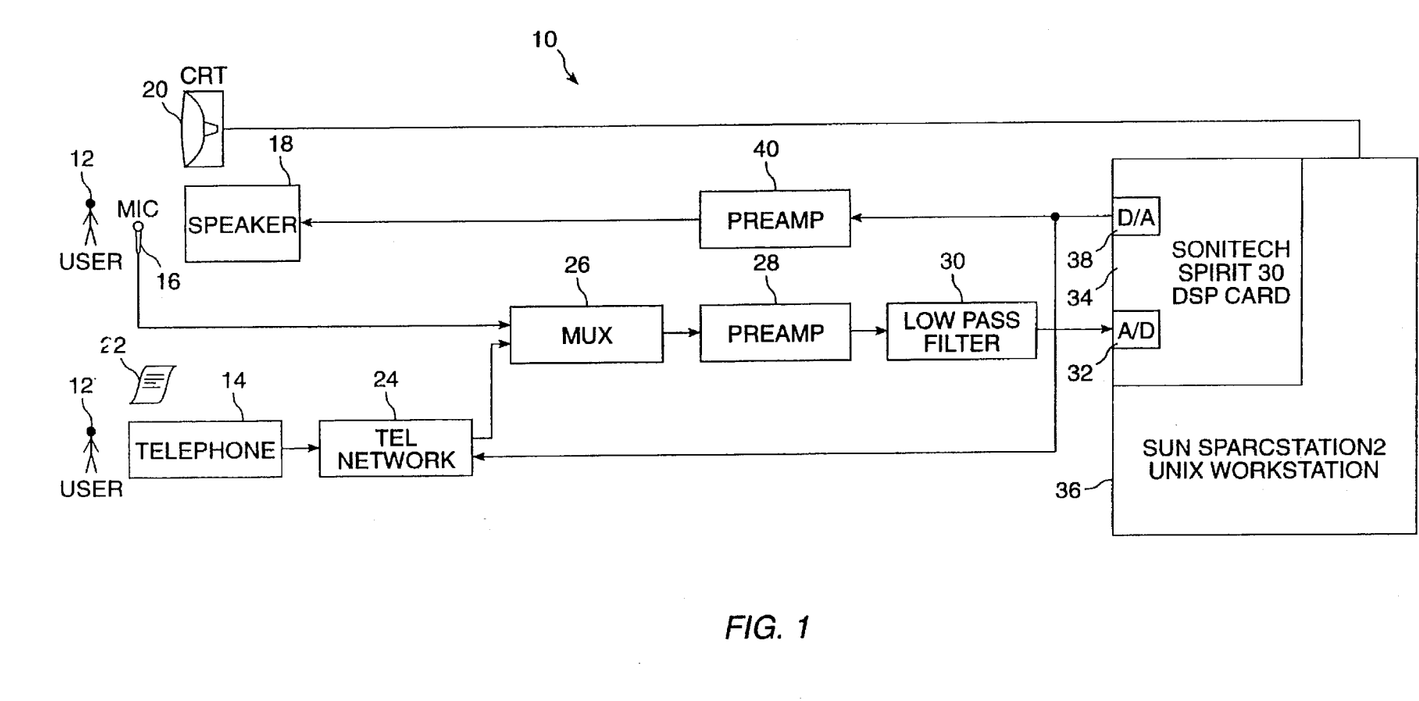
FIG. 1 is a block diagram of a system according to the invention.

Referring to FIG. 1, there is shown a system block diagram of an instructional apparatus 10 according to the invention for instructing a user 12 located close to the apparatus 10 or for instructing a user 12' located remotely from the apparatus 10 and communicating via telephone 14. The local user 12 may interact with the system through a microphone 16, receiving instructions and feedback through a loudspeaker or earphones 18 and a visual monitor (CRT) 20. The remote user 12' receives prompts through a published or printed text 22, as from a newspaper advertisement, or may employ some well-known or memorized text. The remote user's telephone 14 is coupled through a telephone network 24 through a multiplexer 26. The local user's microphone 16 is also coupled to the multiplexer 26. The output of the multiplexer 26 is coupled to a preamplifier 28, through a lowpass filter 30 and then to an analog to digital converter 32, which is part of a digital signal processing (DSP) subsystem 34 in a workstation or timesharing computer 36. Output from the DSP subsystem 34 is provided through a digital to analog converter (DAC) 38 to either or both an amplifier 40 or the telephone network 24, which are respectively coupled to the speaker 18 or the telephone 14. The CRT 20 is typically the visual output device of the workstation 36. A suitable DSP subsystem is the "Sonitech Spirit 30" DSP card, and a suitable workstation is the Sun Microsystems SPARCStation 2 UNIX workstation.

Figure 2:
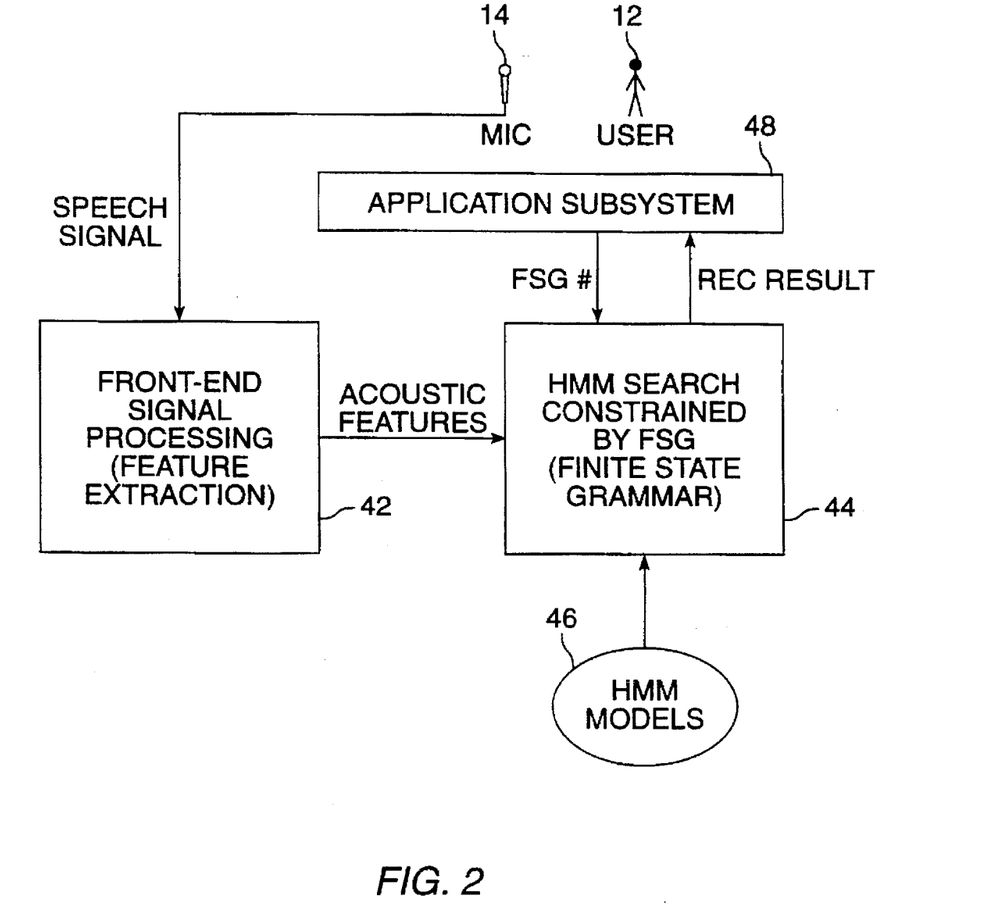
FIG. 2 is a functional block diagram of recognition processes employed with the invention.

Referring to FIG. 2 in connection with FIG. 1, the basic operation of the underlying system is illustrated. The system is preferably built around a speech recognition system such as the Decipher system of SRI International. The user 12 addresses the microphone (MIC) 14 in response to a stimulus such as a visual or auditory prompt. The continuous speech signal of the microphone 14 is fed through an electronic path to a "front end" signal processing system 42, which is contained primarily in the DSP subsystem 34 and subject to control of the mother workstation 36. The front end signal processing system 42 performs feature extraction, feeding acoustic feature parameters to a model searcher 44 which is built around a hidden Markov Model model set (HMM models) 46. The model searcher 44 performs a "search" on the acoustic features, which are constrained by a finite state grammar to only a limited and manageable set of choices. Hence, significant latitude can be granted the user in quality of pronunciation when compared with the HMM models 46. An application subsystem 48 in the form of a prepared lesson of delimited grammar and vocabulary communicates with the model searcher 44. The application subsystem 48 supplies the finite state grammar to the model searcher 44 against which a search is performed and the model searcher 44 communicates via backtracing processes embedded in the speech recognition system, such as Decipher, recognition or nonrecognition, as well as backtrace-generated information, to the application subsystem 48, which then interacts with the user 12 according to the invention.

There are two functional modes to a speech processing system used in connection with the invention, a training mode and a recognition mode. The processing is illustrated in reference to FIG. 3. In a training mode, a training script 102 is presented to a plurality of persons in a training population 104, each of which produces a plurality of speech patterns 106 corresponding to the training script 102. The training script 102 and the speech patterns 106 are provided as an indexed set to a hidden Markov model trainer 108 to build general HMM models of target language speech 111. This needs to be done only once for a target language, which typically may employ native speakers and some non-native speakers to generate general HMM models of target language speech. Then an HMM network model compiler 110, using as input the general HMM models and the preselected script 114, builds a network of speech models 113 specifically for the preselected script. The network model compiler output is provided to a hidden Markov model-based speech recognizer 112.

Figure 3:
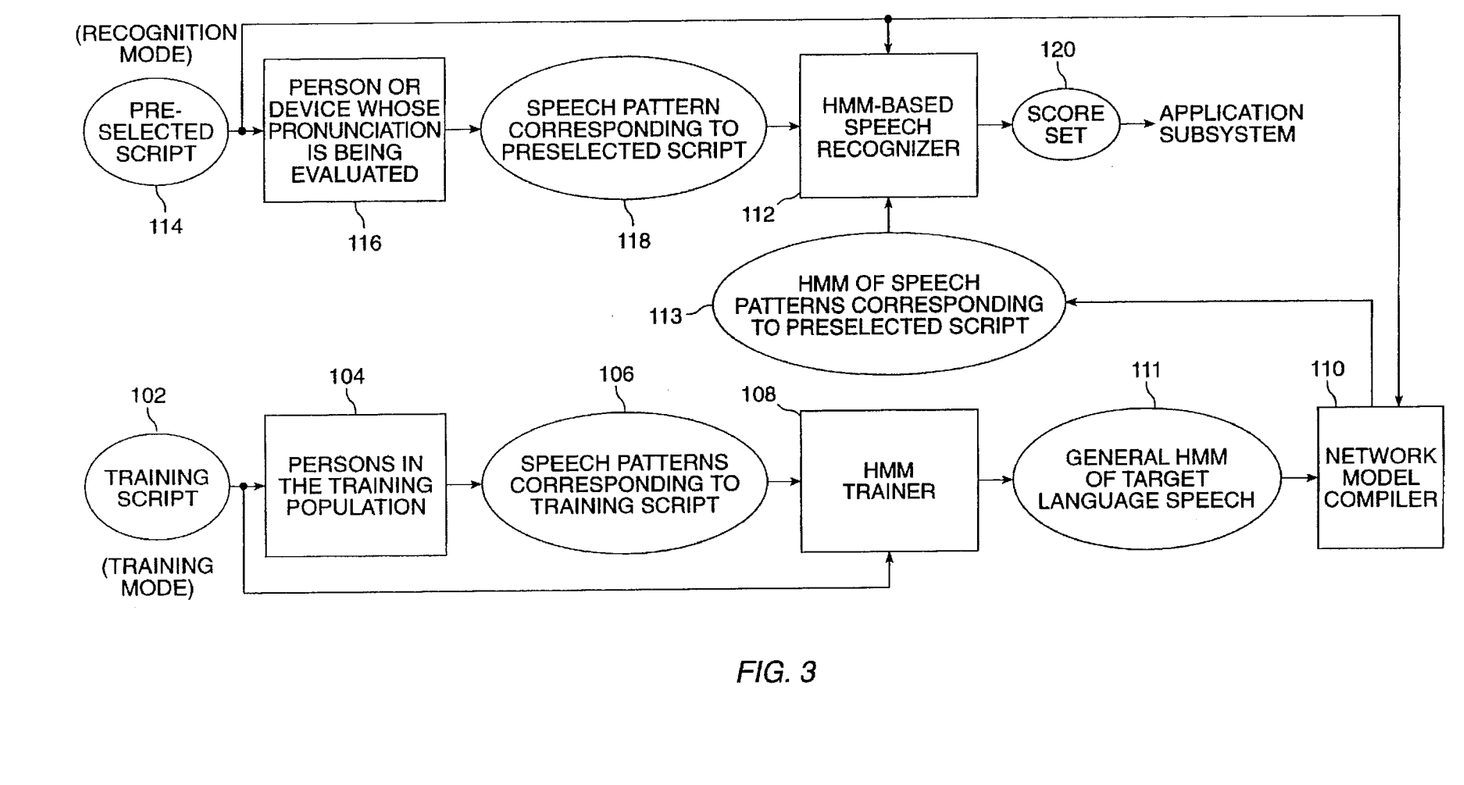
FIG. 3 is a functional block diagram of processes used in connection with the invention.

In a recognition mode, a preselected script 114, which is a functional subset of the training script 102 but does not necessarily include the words of the preselected script 102, is presented to a trainee/user 116 or even a device whose pronunciation is to be evaluated. The speech of the trainee/user 116 is presumed to be in the form of a speech pattern 118 corresponding to the preselected script 114. The preselected script 114 and the single speech pattern 118 are provided as an indexed set to the hidden Markov model speech recognizer 112. During each current evaluation period (a phone-length, word-length, phrase-length or even sentence length-period of time), words are recognized by the recognizer 112. From the number of words recognized during the evaluation period and prior periods, a recognition score set 120 is calculated, passed on to the application subsystem 48 (FIG. 2) serving as a lesson control unit of the type herein described. The score set 120 is a snapshot of the recognition process as embodied in backtrace-generated information. It is passed to the application subsystem 48/lesson control unit which employs a finite state machine embodying the decision apparatus hereinafter explained.

The finite state machine, among other functions, filters the raw score set information to identify only good renditions of the scripted lesson. Specifically, it identifies subsets of the score set upon which to judge the quality of lesson performance, including reading speed and reading quality.

Figure 4A:
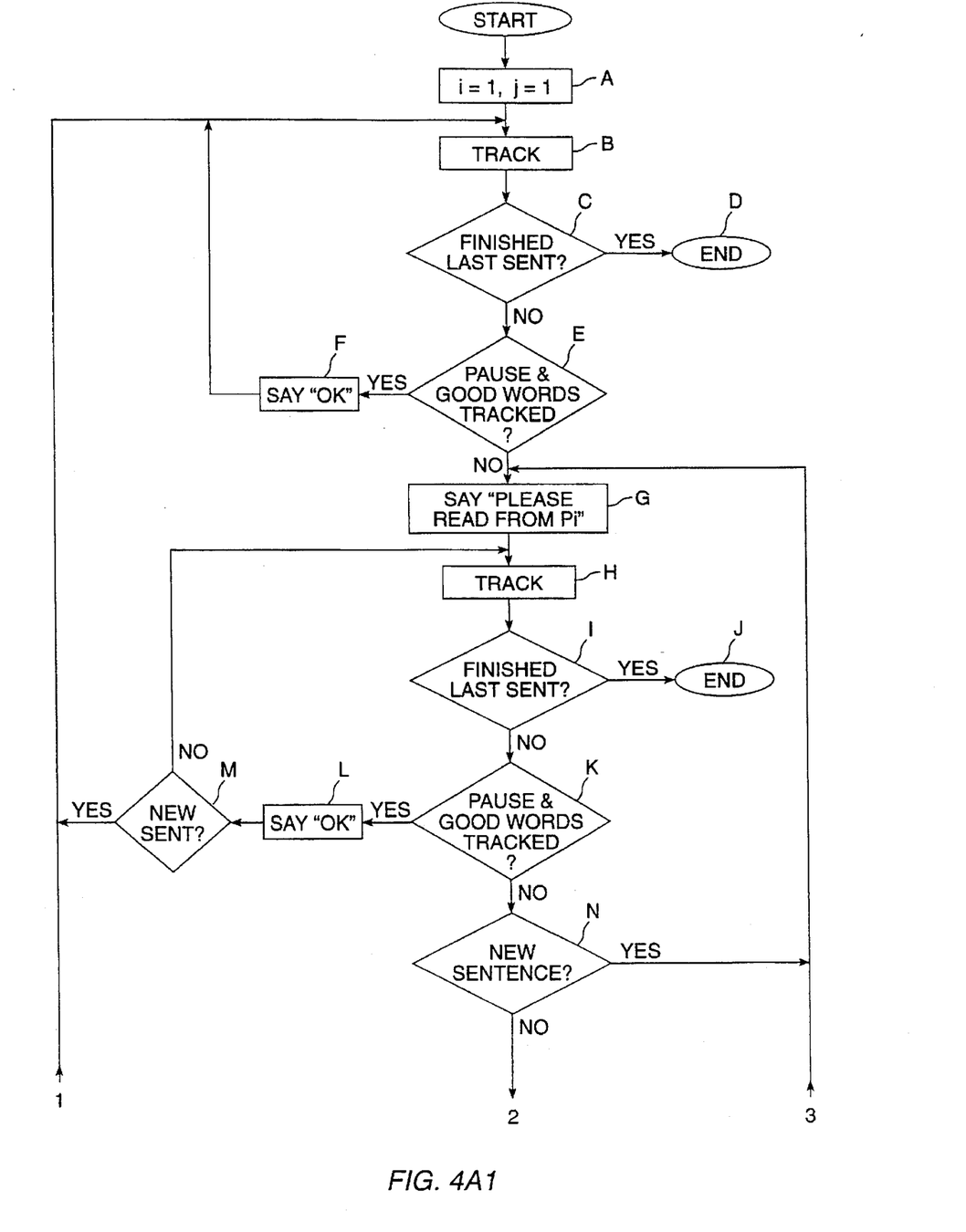
Figure 4A:
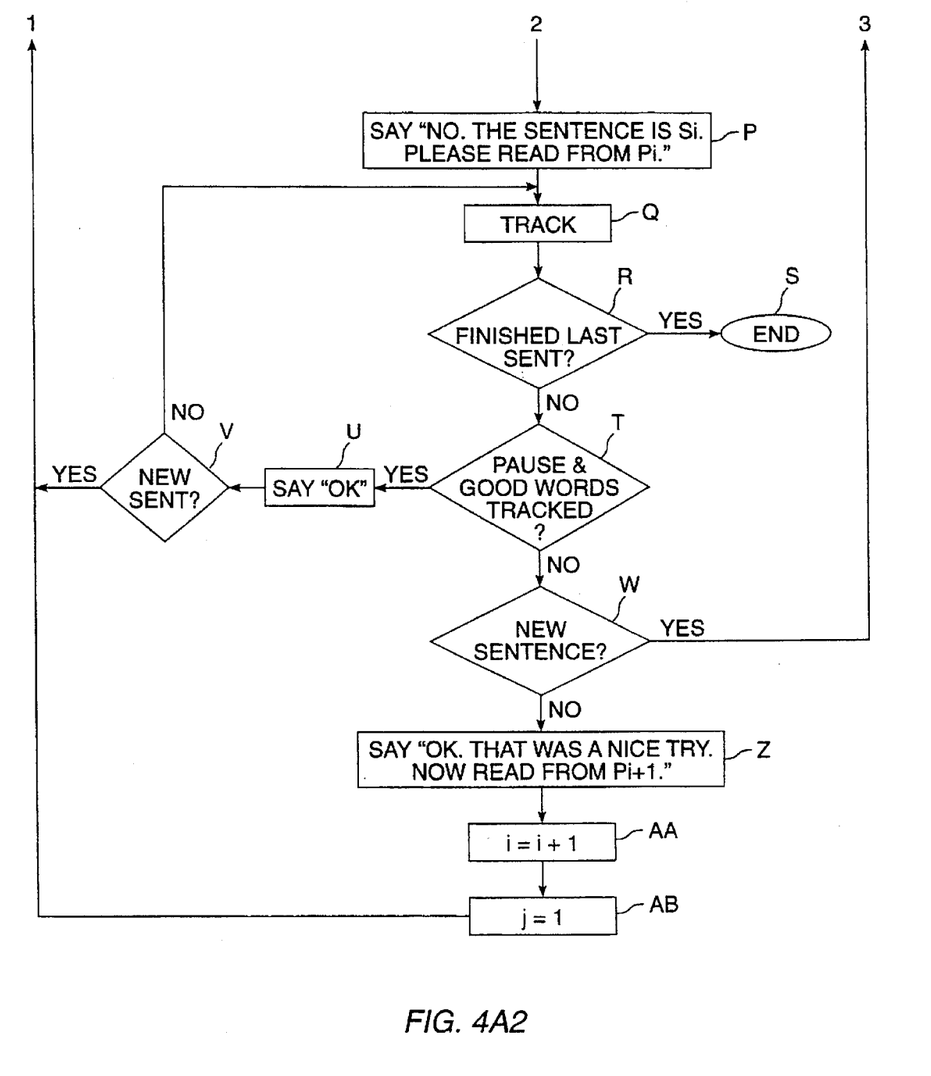

FIG. 4A is a flowchart of a process of pacing a user through a lesson embedded in an apparatus implemented in accordance with the invention. It is implemented as a finite state machine (FSM) which is embedded in the application subsystem 48 which controls the interaction of the user 12 and the lesson material.

In operation, reference is directed by the FSM to a script, which may appear on a CRT screen or produced as printed material to be read. Starting with a sentence index of i=1 and a word index j=1 (Step A), a tracking process is executed (Step B). The FSM tests to determine whether the user has finished reading the last sentence in the script (Step C), causing an exit to END if true (Step D). Otherwise the FSM tests to determine whether the user is pausing as detected by the tracker and has read good (recognizable) words from the script since the last tracking operation (Step E). If true, the FSM responds preferably with an aural or visual positive rejoinder, e.g., the response "okay" (Step F), and the FSM recycles to the tracking process (Step B).

If on the other hand, the FSM determines that the user is not pausing after having read good words since the last tracking operation, the FSM prompts the user by stating: "Please read from P(i)." (Step G) The P(i) is the beginning of the identified location in the script of the phrase containing or immediately preceding the untracked words. The tracking process is thereafter invoked again (Step H), this time at a level of patience wherein the user has effectively one penalty. The FSM then tests for the completion of the last sentence, as before, in this new level (Step I), and ends (Step J) if the script has been completed. Otherwise the FSM tests to determine whether the user is pausing as detected by the tracking operation and has read good (recognizable) words from the script (Step K). If true, the FSM responds with a preferably an aural or visual positive rejoinder, e.g., the response "okay" (Step L), tests for the beginning of a new sentence (Step M) and if yes the FSM recycles to the tracking process (Step B), but if no the FSM recycles to track within the current sentence (Step H).

If words are not being read correctly as indicated by the tracking operation (Step K), the FSM tests to determine whether a new sentence has begun (Step N), in which case the FSM recycles and prompts the user to read from the beginning of the sentence (Step G). If this is not the beginning of a sentence, the FSM states: "No, the sentence is S(i). Please read from P(i)." (Step P). In other words, the user is presented with a model of the sentence and prompted to start at the beginning of the sentence, that is, to try again.

After the prompt, the FSM reinvokes the tracking procedure (Step Q), then tests to see if the last sentence has been spoken (Step R), ending if YES (Step S), otherwise testing to see if the user is pausing after having read good words from the script (Step T). The FSM issues an "ok" if true (Step U), tests for a new sentence (Step V), restarting the tracking (to Step Q) if no, otherwise if a new sentence, resetting to the highest level of patience with tracking (Step B). If the FSM is not tracking good words, it checks to see if a new sentence has started (Step W) and if so, prompts the user to start reading from the initial sentence position P(i) (to Step G). If it is not a new sentence, the FSM shows a loss of patience by reciting a phrase such as: "Ok. That was a nice try. Now read from the beginning of the next sentence."

(i.e., P(i+l)) (Step Z). The sentence counter index i is then incremented by one sentence (i+1) (Step AA) and the word counter index j is reset to 1 (Step AB), returning to the initial tracking process (to Step B), where the FSM regains its initial level of patience.

Figure 4B:
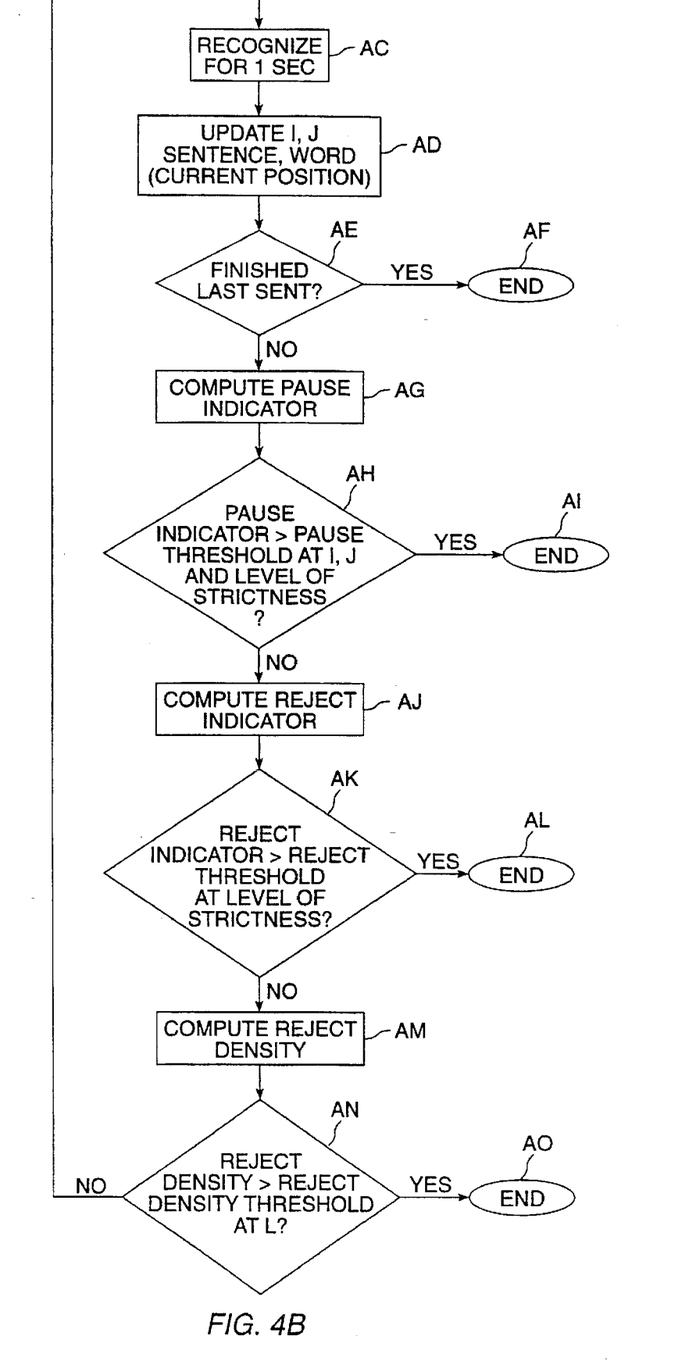
FIG. 4B is a flowchart of a tracking process according to the invention.

FIG. 4B is a flow diagram of the tracking process (Steps B, H, Q) used by the FSM of FIG. 4A. The tracking process examines one second of input speech (Step AC) using for example a hidden Markov model of speech patterns corresponding to the preselected script. The FSM updates the counters (i & j) to the current position (Step AD) and tests to determine whether the last sentence has been recited (Step AE). If yes, the tracking process is exited (Step AF). If the last sentence is not recognized, the FSM then computes a pause indicator, which is the number of pause phones recognized since the previous word (Step AG), which is in general indicative of the length of a pause. It is then compared with a pause indicator threshold for the current position (i,j) and exercise strictness level (Step AH). If the pause indicator exceeds the threshold, the tracking process is exited (Step AI). If not, the FSM computes a reject indicator (Step AJ). The reject indicator, which is in general indicative of the likelihood that the user is not producing speech corresponding to the preselected script, is computed for instance by summming all reject phones returned by the recognizer since the last word.

The reject indicator is thereafter compared to a reject indicator threshold (Step AK), which is a function of the exercise scoring strictness level or of the current position in the text. If the indicator exceeds the threshold, the procedure is exited (Step AL). If not, a reject density is computed (Step AM).

Reject density is computed by examining a previous number of scripted words (e.g., five) counting the number of reject phones returned by the recognizer, and then dividing the number of reject phones by the sum of the number of reject phone and the number of scripted words (five). That quotient is the reject density. Thus, variations in pause lengths do not impact the reject density.

The reject density is thereafter compared with a reject density threshold (a function of exercise strictness level, text position or both) (Step AN). If the reject density exceeds the threshold, the tracking process is ended (Step AO); otherwise the tracking process is continued (Step AC).

The reject indicator threshold, reject density threshold and pause indicator threshold may be variably adjusted as a function of level of strictness or position in text. The adjusting may be done by the user, by the lesson designer or automatically by the system.

Figure 5:
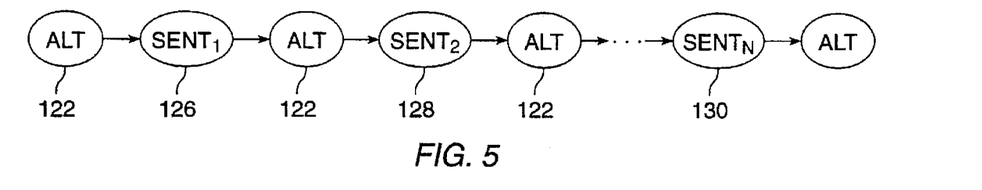
FIG. 5 is a state diagram of a sentence-level grammar used in a reading mode according to the invention.

Referring to FIG. 5, there is shown a structure for a sentence-level grammar during the reading phase of the lesson. The sentence level grammar and associated linguistic structures provide the structural sophistication needed to accommodate pauses, hesitation noises and other out-of-script speech phenomenon expected of speech of a student speaker. The grammar consists of "alt" structures 122 separating sentences 126, 128, 130 which have been recognized from the scripted speech patterns. The purpose of the "alt" structure 122 (etc.) is to identify or otherwise account for out-of-script (nonscripted or unscripted) speech or silence (not merely pauses) which is likely to be inserted by the reader into the reading at various points in the reading or answering exercise. An alt structure according to the invention may be used in a hidden Markov model-based speech recognition system to add versatility to a basic speech recognizer enabling it to handle extraneous or unscripted input in an explicit fashion.

Figure 6:
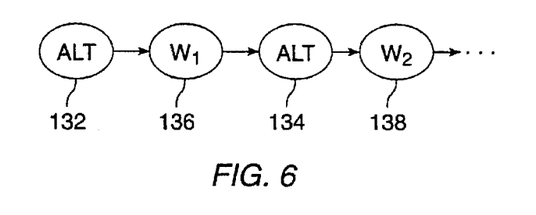
FIG. 6 is a state diagram of a word-level grammar used in accordance with the invention.

Referring to FIG. 6, there is shown the structure of a word-level grammar for a sentence, in either the reading mode or the answering mode. Unlike known word level grammars where a specific key is sought for detection, this grammar explicitly anticipates recitation disfluencies between every word and thus consists of an alt structure 132, 134 between each ordered word 136, 138, each one leading to the next. Whereas words may be returned by the recognizer as atomic units, alt structures are analyzed and returned by the recognizer as strings of reject phones and pause phones which constitute the alt structures as further detailed herein. This gives the application subsystem 48 (FIG. 2) the ability to render higher-level decisions regarding reading by a user.

Figure 7:
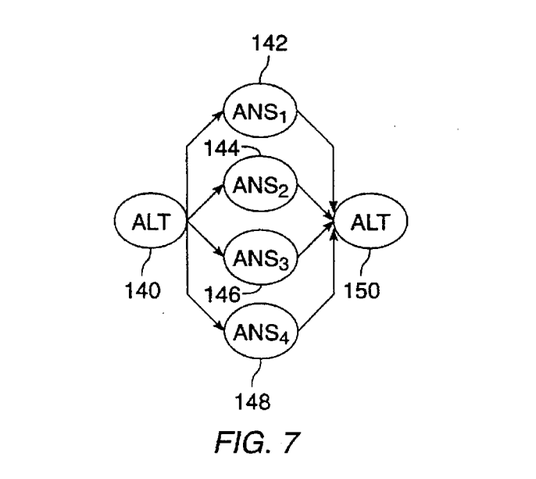
FIG. 7 is a state diagram of a sentence-level grammar used in an answering mode according to the invention.

Referring to FIG. 7, there is shown the structure of a sentence-level grammar in the answering mode. An initial alt 140 is connected by trajectories to any one of a plurality of answers 142, 144, 146, 148 as alternatives, and each of the answers is connected by trajectories to a final alt 150. This grammar for rejecting unanticipated replies from the user by looping on the initial alt 140, rejecting speech after a valid answer by looping on the final alt 150 or by accepting interjections and pauses during the rendition one of the valid answers.

Figure 8:
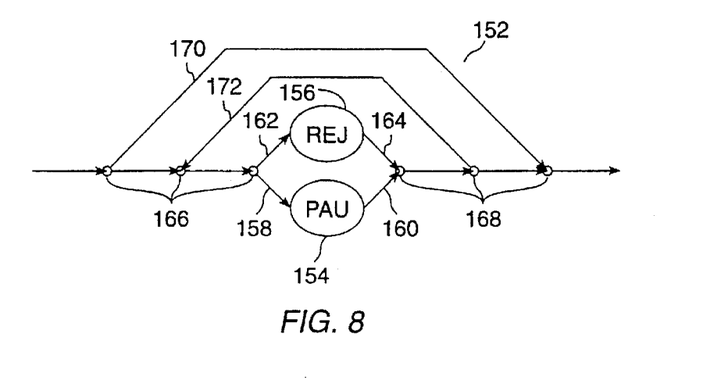
FIG. 8 is a state diagram of an "alt" structure used in the grammars according to the invention.

FIG. 8 illustrates the alt structure 152 common to all alts. The alt structure 152 is a network of hidden Markov states, the parameters of which are trained to account for acoustic features corresponding to out-of-script speech, silence or background noise. It consists of a "pause" model 154 and a "reject" model 156 along alternative forward transition arcs 158, 160, and 162, 164 between an initial node 166 and a terminating node 168. Between the initial node 166 and the terminating node 168 there are also a direct forward transition arc 170 and a direct return transition arc 172. The internal structure of the pause model 154 and the reject model 156 consists of three Markov states and five transition arcs, which is the exact structure used for models of other phones in the Decipher speech recognition system available from SRI International of Menlo Park, California.

The pause model 154 is a phone which is trained on non-speech segments of the training data (typically recorded) and comprises primarily examples of silence or background noise occurring in the training data. The model 156 for the reject phone is a phone which is trained on a wide variety of speech which has been selected randomly or periodically from the training data.

The alt structure 152 with the pause model phone 154 and the reject model phone 156, fully trained, is connected internally by the transition arcs to allow for all of the following possible events: prolonged silence (multiple loops through the pause phone 154 and the return arc 172); prolonged out-of-script speech (multiple loops through the reject phone 156 and the return arc 172); alternating periods of silence and out-of-script speech; and no pause and no out-of-script speech (bypass on forward transition arc 170).

The initial transition arcs 158 or 162 leading to the pause phone 154 and to the reject phone 156 are in one embodiment of the invention equally weighted with a probability of 0.5 each.

Figure 9:
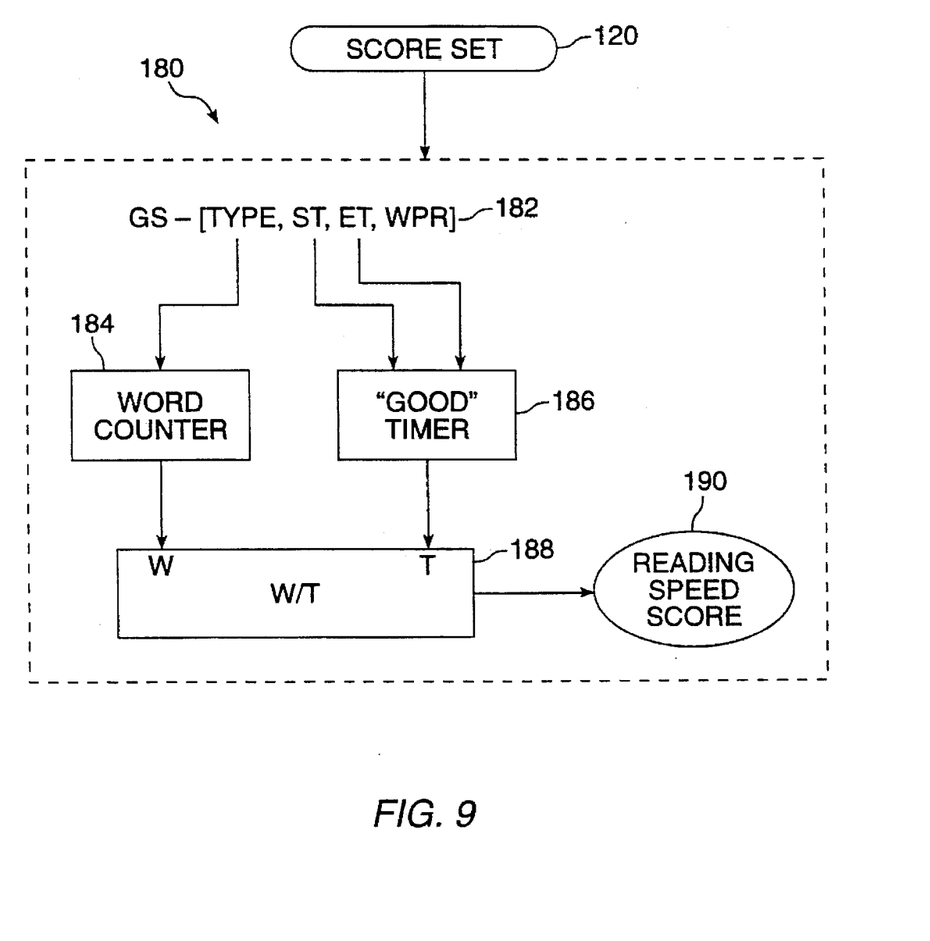
FIG. 9 is a block diagram of a reading speed calculator.

Referring to FIG. 9, there is shown a reading speed calculator 180 according to the invention. It receives from the application subsystem 48 (the finite state machine) a subset (array of data) 182 of the score set 120 identifying the elements of good speech by type (words, pause element, reject element) and position in time, plus certain related timing. Probability information is available but need not be used.

Reading speed is extracted by use of a word counter 184, to count the "good" words, and a timer 186, which measures or computes the duration of the phrases containing the filtered (good) words. A reading speed score 190 is determined from a divider 188 which divides the number of "good" words W by the time elapsed T in reciting the accepted phrases containing the "good" words.

Figure 10:
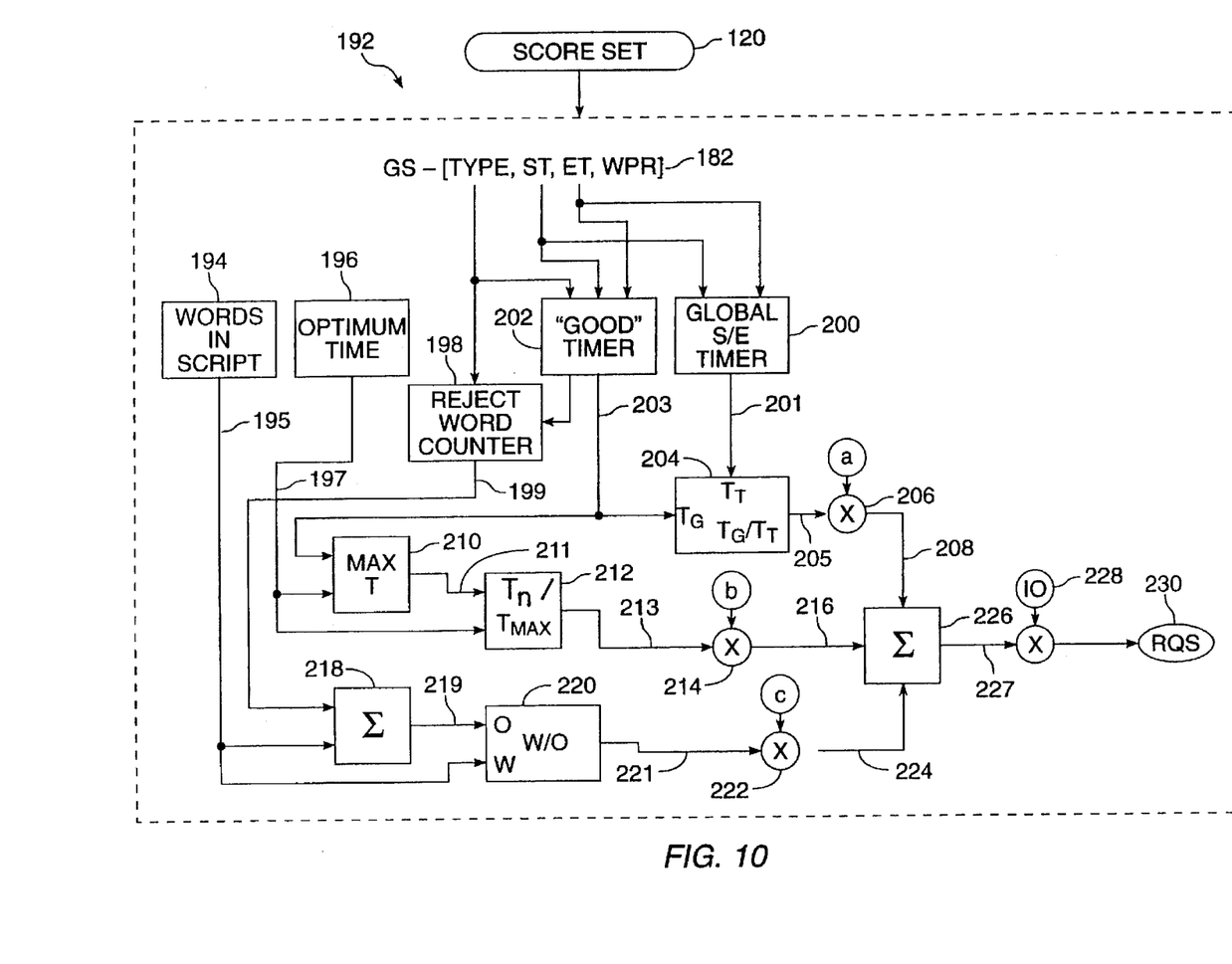
FIG. 10 is a block diagram of a reading quality calculator.

The subsystem herein described could be implemented by a circuit or by a computer program invoking the following equations:

FIG. 10 illustrates a mechanism 192 to determining a reading quality score 230. In connection with the system, there is a word count source 194 providing a count value 195 for number of words in the preselected script, a mechanism 196 by which the optimum reading time 197 of the script is reported, a means 198 for counting number of reject phones (199), a means 200 for measuring total time elapsed 201 during reading of all words in the preselected script, and a means 202 for measuring "good" time elapsed 203 during reading of phrases deemed acceptable by said analyzing means.

A divider means 204 is provided for dividing the the good time value 203 by total time value 201 to obtain a first quotient 205, and a weighting means 206 (a multiplier) is providing for weighting the first quotient 205 by a first weighting parameter ("a") to obtain a first score component 208. The sum of three weighting parameters a, b and c is preferably 1.0 by convention to permit an assignment of relative weight of each of three types of quality measurements.

A selector means 210 is provided for selecting a maximum between the optimum reading time 197 and the good time 203 to produce a preferred maximum value 211. This is used in valuing a preference between a fast reading and a reading which is paced according to a preference. In connection with the preference evaluation, a divider means 212 is provided for dividing the optimum reading time 197 by the preferred maximum value 211 to obtain a second quotient 213. The second quotient is weighted by a second weighting parameter (b) by a weighting means 214 (a multiplier) to obtain a second score component 216.

An adder or summing means 218 is provided for summing the number of reject phones 199 and the number of script words 195 to obtain a quality value 219. A divider means 220 is provided for dividing the number of words 195 by the quality value 219 to obtain a third quotient 221. The third quotient is weighted by a weighting means 222 (a multiplier) by third weighting parameter (c) to obtain a third score component 224.

A three-input summing means 226 is provided for summing the first, second and third score components 208, 216 and 224 to produce a score sum 227. The score sum 227 is scaled to a percentage or other scale by a weighting means multiplying by a scale factor 228, such as the value 10 to obtain the reading quality score 230.

The reading quality evaluation subsystem herein described could be implemented by a circuit or by a computer program invoking the following equation:

$$RQS = 10*(a*T_g/T_r + b*(T_n/[\max(T_n, T_g)]) + c*W/(R_g+W)$$

where:

RQS is the reading quality score on a scale of 1 to 10 (based on the scale factor, herein 10);

a, b, and c are scale factors whose sum equals 1 and in a specific embodiment, a=0.25, b=0.25 and c=0.5;

W is the number of words in the text;

$T_g$ is the "good" time or time spent reading good sentences;

$T_r$ is the total reading time spent reading, excluding initial and final pauses;

$T_n$ is the optimal reading time, i.e., reading time by a good native speaker;

$R_g$ is the number of rejects detected during the "good" renditions of the sentences, i.e., during $T_g$.

Appendix I is a microfiche appendix of source code listing of a system according to the invention implemented on a computer workstation. The language of the source code is C.

The invention has now been explained with reference to specific embodiments. Other embodiments will be apparent to those of ordinary skill in this art upon reference to the present disclosure. It is therefore not intended that this invention be limited, except as indicated by the appended claims.

What is claimed is:

1. A language instruction and evaluation method using an automatic speech recognizer which generates word sequence hypotheses and phone sequence hypotheses from input speech and a grammar model, wherein the input speech is speech spoken by the speaker in response to a prompting of the speaker to recite a preselected script, the method comprising the steps of:

generating a grammar model from the preselected script;

imbedding alt elements in the grammar model between words and sentences of the preselected script thereby forming an altered grammar model, the alt elements representing potential nonscripted speech and pauses;

generating an input hypothesis from the input speech using the automatic speech recognizer with the altered grammar model, wherein the input hypothesis comprises a subset of sequences of words and alts allowed by the altered grammar model;

parsing the input hypothesis into sequences identified as one of words found in the preselected script, nonscripted speech and silence, wherein alts in the input hypotheses are associated with the nonscripted speech and the silence;

evaluating the accuracy of the input speech based on a distribution of alts in the input hypothesis, the accuracy being a measure of how well the input speech corresponds with preselected script which the Speaker of the input speech was prompted to recite; and outputting an indication of the accuracy of the input speech to the speaker, thereby informing the speaker of how well the speaker has recited the preselected script.

2. The method of claim 1, further comprising the steps of:

digitizing the input speech and storing digitized input speech in a digital memory;

storing the grammar model and the altered grammar model in the digital memory; and using a digital computer to compare the input speech with the stored grammar models.

3. The method of claim 1, further comprising a step of, in response to the input speech, prompting the speaker to re-recite the preselected script with phonetic and semantic accuracy, according to at least three levels of patience.

4. A language instruction and evaluation method using an automatic speech recognizer which generates word sequence hypotheses and phone sequence hypotheses from input speech and a grammar model, wherein the input speech is speech spoken by the speaker in response to a prompting of the speaker to recite a preselected script, the method comprising the steps of:

generating a grammar model from the preselected script;

imbedding alt elements in the grammar model between words and sentences of the preselected script thereby forming an altered grammar model, the alt elements representing potential nonscripted speech and pauses;

generating an input hypothesis from the input speech using the automatic speech recognizer with the altered grammar model, wherein the input hypothesis comprises a subset of sequences of words and alts allowed by the altered grammar model;

parsing the input hypothesis into sequences identified as one of words found in the preselected script, nonscripted speech and silence, wherein alts in the input hypotheses are associated with the nonscripted speech and the silence;

evaluating the accuracy of the input speech based on a distribution of alts in the input hypothesis; and outputting an indication of the accuracy of the input speech to the speaker, wherein the preselected script includes alternative texts, the method further comprising a step of generating an interactive conversation grammar model for the alternative texts, the interactive conversation grammar model comprising a first common alt element disposed before a selection of alternative phrases and a second common alt element disposed after the selection of an alternative phrase, thereby permitting alternative responses having phonetic accuracy and semantic inaccuracy.

5. The method of claim 4, further comprising a step of structuring an alt element as a plurality of transition arcs for events, including prolonged silence, prolonged out-of-script speech, speech alternating between periods of silence and periods of out-of-script speech, and speech without pauses or out-of-script speech.

6. A language instruction and evaluation method using an automatic speech recognizer which generates word sequence hypotheses and phone sequence hypotheses from input speech and a grammar model, wherein the input speech is speech spoken by the speaker in response to a prompting of the speaker to recite a preselected script, the method comprising the steps of:

generating a grammar model from the preselected script;

imbedding alt elements in the grammar model between words and sentences of the preselected script thereby forming an altered grammar model, the alt elements representing potential nonscripted speech and pauses;

generating an input hypothesis from the input speech using the automatic speech recognizer with the altered grammar model, wherein the input hypothesis comprises a subset of sequences of words and alts allowed by the altered grammar model;

parsing the input hypothesis into sequences identified as one of words found in the preselected script, nonscripted speech and silence, wherein alts in the input hypotheses are associated with the nonscripted speech and the silence, the step of parsing comprising the steps of:

a) recurrently examining a current segment output by the speech recognizer for scripted words, pause phones and reject phones;

b) determining reject density for the current segment; and c) denoting the current segment as out-of-script speech if the reject density exceeds a reject density threshold;

evaluating the accuracy of the input speech based on a distribution of alts in the input hypothesis; and outputting an indication of the accuracy of the input speech to the speaker.

7. The method of claim 6, wherein the step of determining the reject density for the current segment comprises the step of dividing a reject phone count returned by the speech recognizer for a preselected number of consecutive scripted words by a sum of the reject phone count and a count of the preselected number of consecutive scripted words.

8. A language instruction and evaluation method using an automatic speech recognizer which generates word sequence hypotheses and phone sequence hypotheses from input speech and a grammar model, wherein the input speech is speech spoken by the speaker in response to a prompting of the speaker to recite a preselected script, the method comprising the steps of:

generating a grammar model from the preselected script;

imbedding alt elements in the grammar model between words and sentences of the preselected script thereby forming an altered grammar model, the alt elements representing potential nonscripted speech and pauses;

generating an input hypothesis from the input speech using the automatic speech recognizer with the altered grammar model, wherein the input hypothesis comprises a subset of sequences of words and alts allowed by the altered grammar model;

parsing the input hypothesis into sequences identified as one of words found in the preselected script, nonscripted speech and silence, wherein alts in the input hypotheses are associated with the nonscripted speech and the silence, the step of parsing comprising the steps of:

a) recurrently examining a current segment output by the speech recognizer for-scripted words, pause phones and reject phones;

b) determining reject indicator for the current segment; and c) denoting the current segment as out-of-script speech if the reject indicator exceeds a reject density threshold;

evaluating the accuracy of the input speech based on a distribution of alts in the input hypothesis; and outputting an indication of the accuracy of the input speech to the speaker, thereby informing the speaker of how well the speaker has recited the preselected script.

9. The method of claim 8, wherein the step of determining the reject indicator for the current segment comprises the step of summing a reject phone count returned by the speech recognizer for a preselected number of consecutive scripted words.

10. A language instruction and evaluation method using an automatic speech recognizer which generates word sequence hypotheses and phone sequence hypotheses from input speech and a grammar model, wherein the input speech is speech spoken by the speaker in response to a prompting of the speaker to recite a preselected script, the method comprising the steps of:

generating a grammar model from the preselected script;

imbedding alt elements in the grammar model between words and sentences of the preselected script thereby forming an altered grammar model, the alt elements representing potential nonscripted speech and pauses;

generating an input hypothesis from the input speech using the automatic speech recognizer with the altered grammar model, wherein the input hypothesis comprises a subset of sequences of words and alts allowed by the altered grammar model;

parsing the input hypothesis into sequences identified as one of words found in the preselected script, nonscripted speech and silence, wherein alts in the input hypotheses are associated with the nonscripted speech and the silence, the step of parsing comprising the steps of:

a) recurrently examining a current segment output by the speech recognizer for scripted words, pause phones and reject phones;

b) determining a pause indicator for the current segment; and c) denoting the current segment as an actionable pause if the pause indicator exceeds a pause indicator threshold, the actionable pause representing a turn-taking point in interaction between the automatic speech recognizer and the speaker;

evaluating the accuracy of the input speech based on a distribution of alts in the input hypothesis; and outputting an indication of the accuracy of the input speech to the speaker, thereby informing the speaker of how well the speaker has recited the preselected script.

11. The method of claim 10, further comprising a step of generating the pause indicator threshold as a threshold dependent upon linguistic context of the current segment and position of the current segment in the preselected script, the pause indicator threshold being smaller at ends of sentences and major clauses than elsewhere among words of sentences of the preselected script.

12. The method of claim 10, wherein the pause indicator determining step comprises a step of summing pause phones returned by the speech recognizer out of a preselected number of consecutive words of the preselected script.

13. A system for tracking speech of a speaker using an automatic speech recognizer producing word sequence hypotheses and phone sequence hypotheses from a grammar model and input speech spoken by a speaker prompted to recite a preselected script, the system comprising:

presentation means for presenting information to the speaker about a subject and the preselected script and for prompting the speaker to recite the preselected script;

means for electronically capturing the input speech spoken in response to prompts of the presentation means, wherein captured input speech is stored in a computer memory;

means for analyzing the captured input speech to determine a sequence of words and alts corresponding to the captured input speech, wherein a word is identified as being part of the preselected speech and alts represent nonscripted speech and pauses;

assessing means coupled to the analyzing means for assessing completeness of an utterance to determine accuracy of the recitation of the preselected script, the accuracy being a measure of how well the input speech corresponds with preselected script which the speaker of the input speech was prompted to recite; and    producing means coupled to the assessing means for producing a response, if the recitation is not accurate, instructing the speaker to correctly recite the preselected script.

14. The system according to claim 13, wherein the system for tracking is used for instruction in a language foreign to the speaker and wherein the producing means includes means for generating an audible response as an example of native pronunciation and rendition of speech in the language.

15. The system according to claim 13, further comprising means for measuring recitation speed comprising:

means for counting words recited to determine a recited word count;

means for measuring time duration of a recitation of scripted words; and    means for dividing the recited word count by the measured time elapsed.

16. The system according to claim 13, further comprising means (192) for measuring recitation quality, thereby obtaining a recitation quality score (230), the means for measuring recitation quality comprising:

means (194) for counting words (195) in the preselected script to determine a preselected script word count;

means (196) for determining an optimum recitation time (197;

means (198) for counting reject phones (199) to determine a reject phone count;

means (200) for measuring a total time (201) elapsed during recitation of the preselected script;

means (202) for measuring good time (203) elapsed during recitation of phrases deemed acceptable by the analyzing means;

means (204) for dividing the good time (203) by the total time (201) to obtain a first quotient (205);

means (210) for outputting a preferred maximum value (211) which is a maximum of the optimum recitation time (197) and the good time (203);

means (212) for dividing the optimum recitation time (197) by the preferred maximum value (211) to obtain a second quotient (213);

means (218) for summing the reject phone count (199) and the preselected script word count (195) to obtain a quality value (219);

means (220) for dividing the preselected script word count (195) by the quality value (219) to obtain a third quotient (221); and    means for calculating the recitation quality score (230) as a weighted sum of the first quotient (208), the second score quotient (216) and the third score quotient (224).

17. A system for tracking speech of a speaker using an automatic speech recognizer producing word sequence hypotheses and phone sequence hypotheses from a grammar model and input speech spoken by a speaker prompted to recite a preselected script, the system comprising:

presentation means for presenting information to the speaker about a subject and the preselected script and for prompting the speaker to recite the preselected script;

means for electronically capturing the input speech spoken in response to prompts of the presentation means, wherein captured input speech is stored in a computer memory;

means for analyzing the captured input speech to determine a sequence of words and alts corresponding to the captured input speech, wherein a word is identified as being part of the preselected speech and alts represent nonscripted speech and pauses;

assessing means coupled to the analyzing means for assessing completeness of an utterance to determine accuracy of the recitation of the preselected script;

producing means coupled to the assessing means for producing a response, if the recitation is not accurate, instructing the speaker to correctly recite the preselected script;

means (192) for measuring recitation quality, thereby obtaining a recitation quality score (230), the means for measuring recitation quality comprising:

a) means (194) for counting words (195) in the preselected script to determine a preselected script word count;

b) means (196) for determining an optimum recitation time (197);

c) means (198) for counting reject phones (199) to determine a reject phone count;

d) means (200) for measuring a total time (201) elapsed during recitation of the preselected script;

e) means (202) for measuring good time (203) elapsed during recitation of phrases deemed acceptable by the analyzing means;

f) means (204) for dividing the good time (203) by the total time (201) to obtain a first quotient (205);

g) means (210) for outputting a preferred maximum value (211) which is a maximum of the optimum recitation time (197) and the good time (203);

h) means (212) for dividing the optimum recitation time (197) by the preferred maximum value (211) to obtain a second quotient (213);

i) means (218) for summing the reject phone count (199) and the preselected script word count (195) to obtain a quality value (219);

j) means (220) for dividing the preselected script word count (195) by the quality value (219) to obtain a third quotient (221); and k) means for calculating the recitation quality score (230) as a weighted sum of the first quotient (208), the second score quotient (216) and the third score quotient (224), the means for calculating further comprising:

1) means (206) for weighting the first quotient (205) by a first weighting parameter (a) to obtain a first score component (208);

2) means (214) for weighting the second quotient (213) by a second weighting parameter (b) to obtain a second score component (216);

3) means (222) for weighting the third quotient (221) by a third weighting parameter (c) to obtain a third score component (224);

4) means (226) for summing the first score component (208), the second score component (216) and the third score component (224) to produce a score sum (227); and 5) means for weighting the score sum (227) by a scale factor (228) to obtain the recitation quality score (230).

18. A system for tracking speech and interacting with a speaker using spoken and graphic outputs and an automatic speech recognizer producing word sequence hypotheses and phone sequence hypotheses from input speech spoken by the speaker after being prompted to recite from a preselected script which includes a plurality of preselected script alternatives and from a grammar model, the system comprising:

presentation means for presenting information to the speaker about a subject and prompting the speaker to recite one of the plurality of preselected script alternatives;

sensing means for electronically capturing the input speech, wherein the captured input speech is stored in a computer memory;

analyzing means for analyzing the captured input speech to determine an input hypothesis corresponding to the input speech spoken by the speaker;

identifying means, coupled to the analyzing means, for identifying which preselected script alternative from the plurality of preselected script alternatives best corresponds to the input hypothesis;

assessing means, coupled to the identifying means, for assessing completeness of an utterance to determine accuracy of recitation of the identified preselected script alternative, the accuracy being a measure of how well the input speech corresponds with preselected script which the speaker of the input speech was prompted to recite;

output means, coupled to the assessing means, for outputting a response upon the completion of the utterance, the response indicating to the speaker the accuracy of the recitation of the identified preselected script alternative and the semantic appropriateness of the identified preselected script alternative.

19. The system according to claim 18, wherein the interacting system is for instruction in a language foreign to the speaker and wherein the producing means includes means for generating an audible response as an example of native pronunciation and rendition.

20. The language instruction and evaluation method of claim 1, wherein the step of outputting an indication is a step of indirectly outputting an indication and comprises the steps of:

inputting the indication to a lesson program; and indicating, using the lesson program, to the speaker the accuracy of the speaker's recitation by taking an action consistent with the accuracy input to the lesson program.

* * * * *